United States Patent Office 3,578,405
Patented May 11, 1971

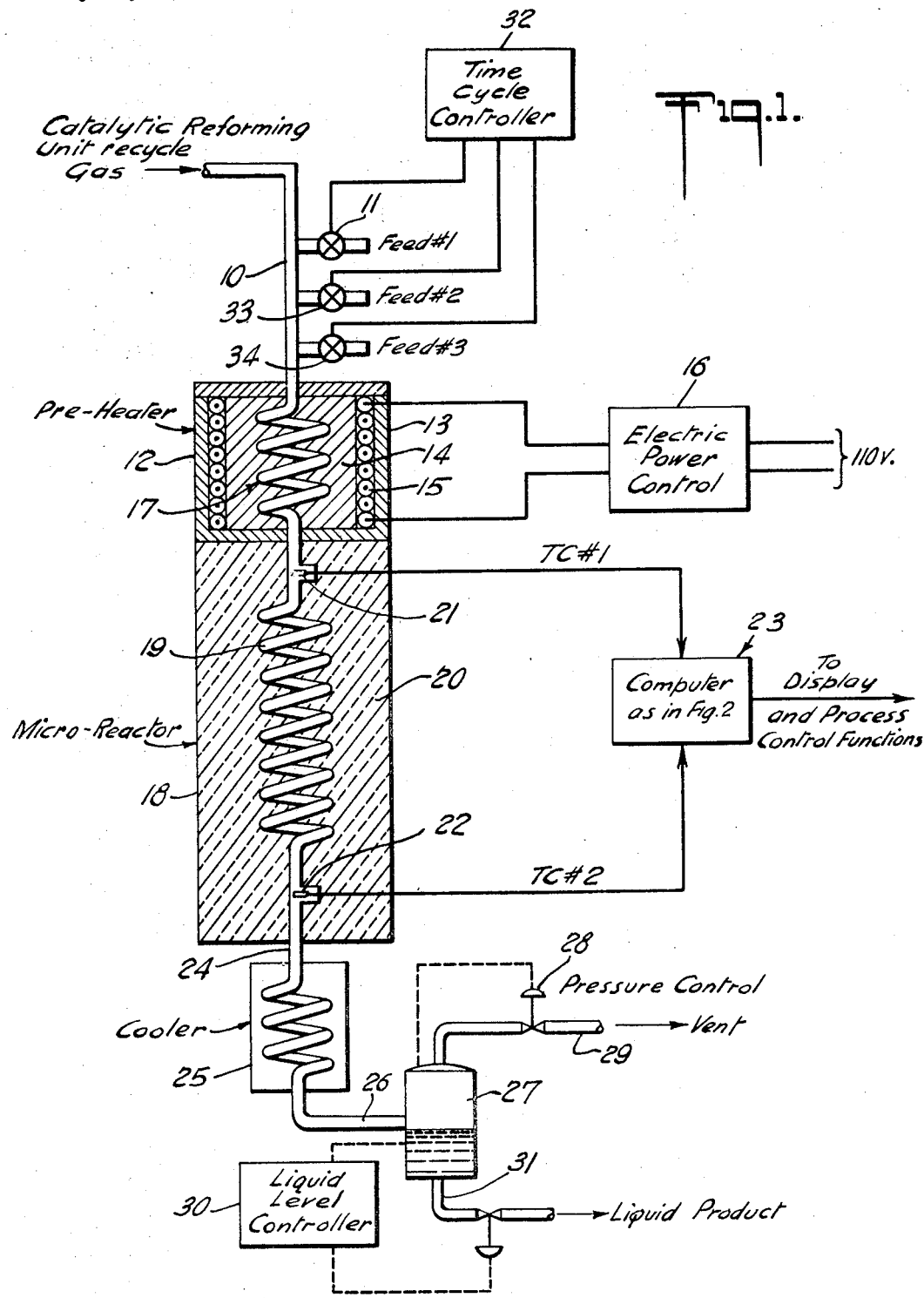

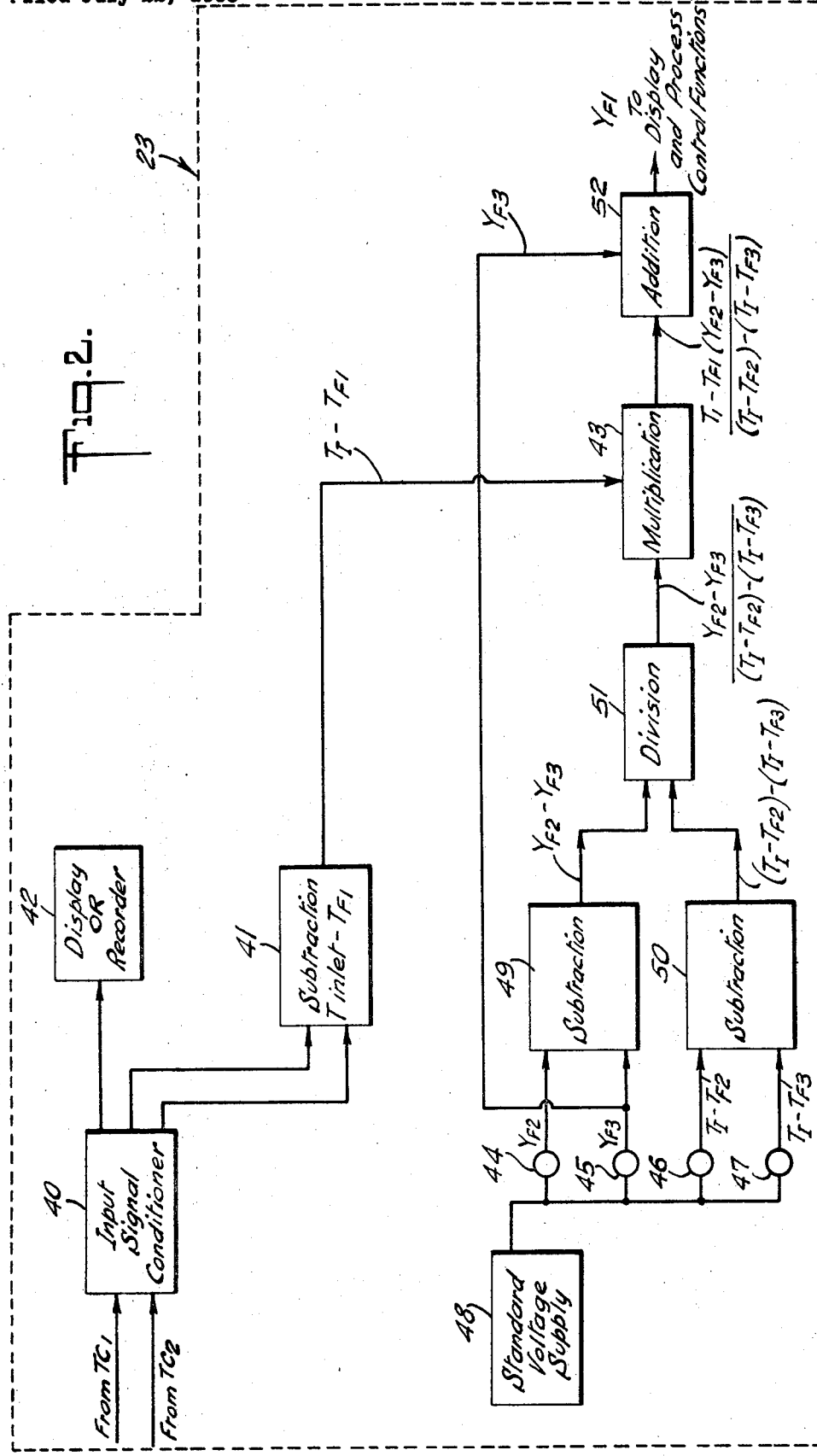

3,578,405
METHOD AND APPARATUS FOR ANALYSIS
OF FLUID MIXTURES
Robert A. Woodle, Nederland, Tex., assignor to
Texaco Inc., New York, N.Y.
Filed July 22, 1968, Ser. No. 746,488
Int. Cl. G06f 15/46; G01n 25/00
U.S. Cl. 23—230
16 Claims

ABSTRACT OF THE DISCLOSURE

A method and apparatus for continuously monitoring a component of a fluid mixture, such as the naphthene content of a hydrocarbon mixture. The apparatus includes an adiabatic selective micro-reactor, such as a dehydrogenation micro-reactor, in which the fluid mixture is reacted to alter a component by conversion to another chemical component having different physical properties such as the heat of formation thereof, and means for sensing the altered physical property such as thermocouples, thereby enabling detection of the fluid component of interest in accordance with the altered physical property. In a further embodiment a unique computer is provided for calculating the concentration in the mixture of the fluid component of interest in response to the sensed heat of the reaction. The method of the invention includes reacting the fluid mixture to alter at least one component of the fluid mixture to a different chemical component having a different physical property thereby rendering the altered fluid component distinguishable, and detecting the fluid component of interest. In one aspect of the method the detecting step includes the steps of sensing the heat of the reaction by sensing the fluid temperature before and after the reaction, and generating signals corresponding to the sensed temperatures, and in response to these signals generating a further signal corresponding to the concentration in the mixture of the fluid component of interest in accordance with a predetermined relationship between the heat of said reaction and said concentration.

BACKGROUND OF THE INVENTION

This invention relates to a method and apparatus for the analysis of fluid mixtures and more particularly to the analysis of hydrocarbon mixtures.

In laboratory and industrial applications it is frequently necessary to analyze a fluid mixture to determine the concentration of its constituents. This is of particular importance in connection with computer control and optimization of fluid processes in the petroleum refining industry where the economy of various processes is often predicated upon accurate information regarding the composition of fluid mixtures undergoing process treatment or the concentration therein of selected fluid components.

Certain fluid mixtures, particularly the hydrocarbons, are difficult to analyze or separate due to the similarity of the physical properties of the fluid components arising from the similarity of the molecular structures thereof. Thus, the components of a fluid mixture may have similar boiling points, similar adsorption characteristics, or they may be composed of similar non-polar molecules. Such similarities render the analysis or separation of these fluid mixtures by presently known physical methods, such as chromatography or fractionation, extremely difficult.

An example of a fluid mixture difficult to analyze is found in connection with the catalytic reforming process for the octane improvement of fuels. The process charge stream usually comprises a mixture of aromatics, naphthenes, and paraffins. Both the naphthenes and the paraffins may be distinguished from the aromatics by chromatographic analysis. But the naphthenes cannot be easily distinguished from the paraffins due to the similar physical properties of these components. One method by which such a mixture may be analyzed is by use of a mass spectrograph. However, this technique does not lend itself to on-line continuous process use in its present state of development. Also, the adaptation of a chromatographic analysis technique to partially analyze the fluid mixture is disadvantageous due, in part, to the intermittent sampling and analysis inherent in this technique.

For the purpose of computer or automatic control of the catalytic reforming process, it is important to continuously analyze the charge stream for its naphthene content since the naphthenes are the main reactants in the process. The naphthene content in the charge stream is therefore a key variable of the process. Hence, if information thereof is continuously made available to a computer control loop controlling other variables of the process, the process may be optimized, improving its economy and the quality of the product.

The invention as herein disclosed provides a solution to the aforementioned problems by a unique and novel method and apparatus for the continuous analysis of fluid mixtures suitable for many process control applications.

SUMMARY

Briefly stated, a preferred aspect of the invention provides a method for continuously monitoring a component of a fluid mixture having physical properties sufficiently similar to other fluid components of the fluid mixture rendering it difficult to separate or distinguish the fluid component of interest therefrom. The method includes reacting a sample of the fluid mixture in a chemical reaction which affects at least one component of the fluid mixture so as to alter at least in part the chemical structure and at least one physical property thereof rendering the fluid component of interest distinguishable from the fluid mixture, and detecting the fluid component of interest. In one version of the method the chemical reaction is of a nature to alter the heat of the formation of one component of the fluid mixture to an extent which is measurably distinguishable from the effect of the reaction on the heat of the formation of the balance of the fluid mixture, and in this version the method includes the steps of; reacting the fluid mixture in the aforementioned chemical reaction, sensing the heat of the reaction, and in response generating a signal representative of the fluid component of interest in accordance with a predetermined relationship between the heat of the reaction and the fluid component of interest. In one aspect of the method the aforementioned predetermined relationship is developed in accordance with the steps of generating signals representative of the heat of reaction and of the concentration of the fluid component of interest in a first and second reference fluid mixtures of known concentration and in response generating a signal representative of the aforementioned relationship. In further response a signal is generated representative of the concentration of the fluid component of interest in the fluid mixture being tested.

Another aspect of the invention provides apparatus in novel combination for detecting the fluid component of interest which includes a micro-reactor wherein the fluid mixture is subjected to the aforementioned chemical reaction and sensing means for sensing the heat of the reaction.

In a further embodiment a novel analog computer is provided operatively coupled with the heat sensing means for providing an output signal representative of the concentration of the fluid component of interest in the fluid mixture. The computer includes manual entry means for entering into the computer information of the concentration of the fluid component of interest in first and second reference fluid mixtures having known concentrations, signal generating means for providing signals representative of the sensed heats of reaction of the known fluid mixtures and of the sample fluid mixture being tested, and computing means for computing the relationship between the respective heats of the reaction of the reference fluid mixtures and the concentrations therein of the fluid component of interest and for applying said relationship to the signal representative of the heat of reaction of the fluid mixture being tested, and means for providing in response thereto an output signal representative of the concentration of the fluid component of interest in the fluid mixture being tested.

In a still further embodiment for detecting the naphthene content of a hydrocarbon mixture the micro-reactor is adapted to subject the fluid mixture to an endothermic dehydrogenation reaction converting at least a portion of its naphthene content to aromatics. To speed the reaction a suitable reforming catalyst is provided in the micro-reactor. To further stimulate the reaction means are optionally provided for controlling, in part, the physical environment within the micro-reactor including heating means for heating the micro-reactor inlet to an elevated temperature, and a source of a suitable carrier gas such as hydrogen at an elevated pressure. Means are also included for sensing the heat of the reaction from which the naphthene content of the fluid mixture may be detected.

In view of the foregoing it is an object of the invention to provide an improved method for the analysis of fluid mixtures.

Another object of the invention is to provide a method for detection of a component of a fluid mixture difficult to distinguish from the mixture by employing a chemical reaction producing identifiable components.

Another object of the invention is to provide a method for determining the conceneration in a fluid mixture of a component difficult to distinguish from the mixture.

Another object of the invention is to provide a method for monitoring the naphthene content of a fluid mixture of hydrocarbons.

Another object of the invention is to provide embodiments of apparatus to fulfill the aforementioned objectives.

These and other objects, advantages and features of the invention will be more fully understood by referring to the following descriptions and claims taken in conjunction with the accompanying drawings.

BRIEF DESCRIPTION OF THE DRAWINGS

FIG. 1 is a cross-sectional view, partly in block diagram form, illustrating an embodiment of the micro-reactor of the present invention adapted for use in conjunction with a catalytic reforming unit.

FIG. 2 is a schematic block diagram of a computer which may be used in conjunction with the micro-reactor of the invention to determine the concentration of the fluid component of interest in the fluid mixture tested by the micro-reactor.

DESCRIPTION OF THE PREFERRED EMBODIMENTS

Referring to FIG. 1 there is provided a micro-reactor adapted to analyze the fresh feed of a catalytic reforming unit for its naphthene content. The composition of the fresh feed is typical of that encountered in catalytic reforming processes and includes components of naphthenes, aromatics and paraffins. It is to be understood that as used herein the term fluid component shall signify any group of one or more similar chemical compounds such as, for example, a component of naphthenes, a component of paraffins, etc. The fresh feed is introduced to a conduit 10 through an electrically operated flow control valve 11. Admixing with the fresh feed is recycle gas introduced into the conduit 10 from the catalytic reforming unit, not shown. The recycle gas is composed of approximately 80% hydrogen, the balance being largely methane, ethane, and propane. It should be understood that the recycle gas serves primarily as a carrier agent for the fluid mixture being analyzed and hence may be of any composition which does not interfere with the chemical reaction to which the fluid mixture is subjected. However, the use of hydrogen is preferred in the analysis of the catalytic reforming fresh feed to help prevent coking of the reforming catalyst used in the micro-reactor discussed below. The recycle gas is charged into the conduit 10 at a constant rate of about 12 standard cubic feet per hour, and the fresh feed is charged at a rate of about 200 milliliters per hour. These hydrogen and fresh feed charge rates maintain a liquid velocity entering the apparatus of about 10 volumes per volume of catalyst per hour and a hydrogen to hydrocarbon mol ratio of about 8 to 10. This inlet mixture passes through the conduit 10 and enters into a preheater zone 12, which is comprised of about 2 feet of $3/16$ inch diameter steel tubing 17 mounted in a chamber 13, which is filled with lead 14 for uniform heat distribution. Also included are heating coils 15 which are connected with a suitable source of electric power 16 such as 110 volts AC. The heating coils and lead packing are configured to provide a temperature of about 900° F. at the exit end of the tubing 17 carrying the mixture being analyzed. The choice of this temperature depends upon the fluid mixture being analyzed and is generally not critical. However, the temperature chosen should be one at which the desired chemical reaction will take place and is most favored thermodynamically. Also, it should be maintained substantially constant during operation. For the analysis of fluid mixtures of naphthenes, aromatics and paraffins satisfactory results are obtained by operating at a temperature in the range of about 800° F. to 1000° F., while best results are obtained at temperatures in the range of 850° F. to 950° F. The fluid mixture thus heated enters a micro-reactor 18 which is comprised of about 4 feet of $3/16$ inch diameter steel tubing 19 filled with 35 to 80 mesh platinum reforming catalyst. To maintain substantially adiabatic conditions in the tubing 19 it is surrounded with a suitable insulating material 20. Thermocouples 21 and 22 are mounted in the tubing 19 at the inlet and outlet sections, respectively, of the micro-reactor 18. The fluid mixture being analyzed, after passing through the preheater 12 where it is heated as discussed above passes over the first thermocouple 21 where its temperature is sensed, and enters the reactor tube 19 where it endothermically reacts in contact with the catalyst resulting in dehydrogenation of the naphthene component of the mixture, and some reforming of the paraffin components thereof. This reaction is manifested in a sensible heat loss or temperature decline of the fluid mixture, the temperature drop being proportional to the amount of naphthenes in the mixture. Following the reaction, the temperature of the mixture is sensed by the second thermocouple 22 in contact with the exit stream of the micro-reactor 18. The relationship between the concentration in the mixture of the naphthenes being analyzed and the sensed temperature difference may be determined analytically in advance, or it may be determined experimentally, by calibration. This relationship is pre-programmed in a computer 23 to which are transmitted the signals from the thermocouples 21 and 22. Should manual calculation of the percentage naphthenes be preferred then the thermocouple signals can be transmitted to a conventional thermocouple temperature display device where they can be read by a human observer.

Fitted to the exit end of the micro-reactor 18 is a conduit 24 for carrying the reacted fluid mixture to a cooler 25 where the fluid mixture is condensed and from which it flows through a conduit 26 to a receiver 27. The pressure in the micro-reactor and in the balance of the system is controlled by a conventional pressure controller 28 mounted in a vent conduit 29 fitted to the upper portion of the receiver 27. The choice of operating pressure depends upon the fluid mixture being analyzed, and is generally not critical. A system pressure anywhere in the range of zero to 600 p.s.i.g. can be used without undue complications of the apparatus. For the analysis of fluid mixtures of naphthenes, aromatics, and paraffins best results are obtained by operation at a pressure in the range of about 200 to 500 p.s.i.g. A conventional liquid level controller 30 is provided, fitted to a product removal conduit 31 for carrying the liquid product of the process from the receiver 27. It should be noted that the use of the cooler 25, the receiver 27, and the associated equipment 26, 28–31 as shown, is entirely optional and are provided merely to avoid waste of the micro-reactor products.

Since the catalyst in the reactor tube 19 gradually deactivates, it is preferred that the aforementioned relationship between the sensed temperature difference and the concentration in the fluid mixture of the naphthenes be determined experimentally, and periodically calibrated. Calibration may be done once a week, or more often if required depending upon the frequency and severity of use. To calibrate the system automatically, an electrical time cycle controller 32 is provided which incorporates conventional program-timing elements and which is programmed to periodically execute the calibration sequence. The electrical time cycle controller 32 also includes output circuits to operate the electrical valve 11 and electrical valves 33 and 34, which are coupled with the micro-reactor inlet conduit 10, and control the flow of calibration mixtures of known composition indicated as feed No. 2 and feed No. 3, respectively, from sources not shown. In the calibration cycle the time cycle controller 32 first introduces feed No. 2 by closing the valve 11 and opening the valve 33, while the valve 34 is maintained closed. The calibration feed No. 2 consists of a laboratory-analyzed typical feed stock of well known naphthene content. This is run long enough, approximately 30 minutes, to allow the system to come to equilibrium. The thermocouples 21 and 22, respectively, sense the micro-reactor inlet and outlet temperatures which are transmitted to the input signal conditioner of the computer 23 as illustrated in FIG. 2 from which they are in turn transmitted to a display unit where they may be observed and recorded. The time cycle controller 32 then switches the inlet flow to feed No. 3, by opening the valve 34 and closing the valves 33 and 11. Feed No. 3 is a laboratory-analyzed reformed naphtha typical of a catalytic reformer product stream and contains a well known percentage of naphthene in the low range, usually of the order of 7% or less. This feed is again run long enough until the equipment reaches equilibrium, and then the micro-reactor inlet and outlet temperatures are sensed as discussed above. Throughout the calibration procedure, the micro-reactor inlet temperature is held substantially constant.

The calibration procedure establishes the heat of the reaction as manifested by a temperature change across the micro-reactor associated with the two fluid mixtures of known naphthene content. The naphthene content of the fluid mixture being tested, i.e. feed No. 1, is related to the results of the calibration procedure in accordance with the following equation:

$$Y_{F1} = Y_{F3} + \frac{(Y_{F2} - Y_{F3})(T_I - T_{F1})}{(T_I - T_{F2}) - (T_I - T_{F3})} \quad (1)$$

where:

$T_I$ = micro-reactor inlet temperature, °F.
$T_{F1}$ = micro-reactor outlet temperature, feed No. 1, °F.
$T_{F2}$ = micro-reactor outlet temperature, feed No. 2, °F.
$T_{F3}$ = micro-reactor outlet temperature, feed No. 3, °F.
$Y_{F1}$ = percent naphthenes in feed No. 1.
$Y_{F2}$ = percent naphthenes in feed No. 2.
$Y_{F3}$ = percent naphthenes in feed No. 3.

Optionally, feed No. 2 may be a relatively pure cycloparaffin having a boiling point within the range of the feed mixture being tested, such as methyl cyclohexane (MCH), and feed No. 3 may be a naphthene-free material, such as a pure paraffin sample. The important aspects of the calibration feeds are that they represent stocks in approximately the same boiling range as the mixture being tested, that they be comprised of paraffins and/or naphthene and/or aromatics, i.e. that they be olefin-free, that they be of known composition, and that they represent two relatively widely different concentrations of naphthenes with respect to the expected range of naphthenes in the fluid mixture being tested.

The following examples illustrates the analysis of two tests mixtures using different calibration mixtures:

EXAMPLE I

Feed No. 1: Test mixture of heavy SR naphtha, nominal boiling point in the range of 200–400° F.
Feed No. 2: Heavy SR naphtha, nominal boiling point in the range of 200–400° F., analyzing 51.0% naphthenes by mass spectrograph.
Feed No. 3: Reformed gasoline analyzing aproximately 4.0% naphthenes.

The following are the sensed temperatures in this example:

$T_I = 940°$ F.
$T_{F1} = 850°$ F.
$T_{F2} = 838°$ F.
$T_{F3} = 930°$ F.

The percent naphthenes in feed No. 1 is by Equation (1):

$$Y_{F1} = 4.0 + \frac{(51.0 - 4.0)(940 - 850)}{(940 - 838) - (940 - 930)}$$

$$Y_{F1} = 50.0\%$$

EXAMPLE II

Feed No. 1: Light SR naphtha, nominal boiling point in the range of 150–250° F.
Feed No. 2: Light SR naphtha, nominal boiling point in the range of 150–250° F. analyzing 40.0% naphthenes by mass spectrograph.
Feed No. 3: Benzene-toluene mixture, with 0% naphthenes.

The following are the sensed temperatures in this example:

$T_I = 930°$ F.
$T_{F1} = 850°$ F.
$T_{F2} = 860°$ F.
$T_{F3} = 927°$ F.

The percent naphthenes in feed No. 1 is:

$$Y_{F1} = 0 + \frac{(40.0 - 0)(930 - 850)}{(930 - 860) - (930 - 927)}$$

$$Y_{F1} = 47.8\%$$

It should be noted that since the micro-reactor is calibrated in accordance with the foregoing, the reaction therein of the fluid mixture tested need not be complete, i.e., the reaction need not affect the entire amount in the fluid mixture of the component reacted. Also the reaction may affect more than one component in the fluid mixture. Thus, for example, in a mixture containing naphthenes, paraffins and aromatics, a portion of the paraffins may be reformed while a portion of the naphthenes are converted to aromatics. The device after calibration is nontheless able to solve for the naphthene content of the mixture. Similarly, the device may be used to solve for a component of the mixture other than the one reacted. For example, in analyzing a mixture of naphthenes and paraffins to determine the paraffin content the device may be calibrated to account for the heat of the naphthene reaction and the paraffin component may be solved for inferentially. It should be further noted that in the analysis of any fluid mixtures the reaction employed in the micro-reactor need not be endothermic but may also be exothermic. It is merely necessary that the reaction manifest itself by a temperature difference between the micro-reactor inlet and outlet. Also, the reaction need not be adiabatically controlled, since any heat exchange occurring can be compensated for by calibration. However, the use of insulation around the micro-reactor is advantageous to improve the accuracy of the system by preserving the temperature change arising from the reaction.

Referring now to FIG. 2 which is a schematic block diagram of a computer which may be used in conjunction with the micro-reactor of the invention to determine the concentration of the fluid component of interest in the fluid mixture tested, the signals from the thermocouples 21 and 22 are transmitted to an input signal conditioner unit 40 which employs conventional bridge type thermocouple completion circuits and provides signals corresponding to the sensed temperatures. These signals can be observed on a conventional display unit or a chart recorder 42. Further, these signals are transmitted to an analog subtraction element 41 which subtracts the signal of the micro-reactor outlet temperature from the signal of the micro-reactor inlet temperature and transmits a corresponding difference signal to a multiplication element 43.

The information obtained from a calibration run employing two known mixtures is entered into the computer by manual operation of potentiometers 44, 45, 46, and 47. The potentiometers 44 and 45 are set to correspond to the concentrations of the fluid component of interest in the first and second calibration mixtures, respectively, and the potentiometers 46 and 47 are set to correspond to the micro-reactor inlet-outlet temperature difference obtained by observation of the display device 42 when the first and second calibration mixtures, respectively, are passed through the micro-reactor. A standard voltage supply 48 is provided, coupled with the potentiometers 44–47 so that the potentiometers provide signals corresponding to their respective settings. The signals from the potentiometers 44 and 45 corresponding respectively to $Y_{F2}$ and $Y_{F3}$ are transmitted to a subtraction element 49 which subtracts the latter signal from the former, and provides an output signal corresponding to $Y_{F2}-Y_{F3}$. The signals from the potentiometers 46 and 47, $T_I-T_{F2}$ and $T_I-T_{F3}$, corresponding respectively to the observed temperature differential of the micro-reactor during the passage therethrough of the first and second calibration mixtures, feed No. 2 and feed No. 3, are transmitted to a subtraction element 50 which subtracts the latter from the former and provides an output signal proportional to this difference, namely, $(T_I-T_{F2})-(T_I-T_{F3})$. This signal is transmitted to a division element 51 to which is also transmitted the signal proportional to $Y_{F2}-Y_{F3}$ from the subtraction element 49. The division element 51 divides the latter signal by the former and provides an output signal corresponding to this quotient which is in turn transmitted to the multiplication element 43 which multiplies this quotient signal by the signal of $T_I-T_{F1}$ from the subtraction element 41. The multiplication element 43 provides an output signal corresponding to this product namely, $$(T_I-T_{F1})(Y_{F2}-Y_{F3})\div[(T_I-T_{F2})-(T_I-T_{F3})]$$

This signal is in turn transmitted to an addition element 52 to which is also transmitted the signal $Y_{F3}$ from the potentiometer 45. The addition element 52 adds its two input signals and provides an output signal corresponding to this sum, namely, $Y_{F1}$. It can be seen that the output signal from the addition element 52 corresponds to the concentration of the fluid component of interest in the fluid mixture tested in accordance with Equation 1 above.

It is to be appreciated by one skilled in the art that while electrical computation elements have been discussed above that pneumatic computation elements can be used in their place quite advantageously. It is also to be appreciated by one skilled in the art that a digital computer can be utilized to perform the computational functions of the analog computer of FIG. 2. In this instance the calibration cycle can be preprogrammed in the computer to occur at suitable frequencies and controlled by the computer. Also, the computer can be preprogrammed to interpret the results of the calibration runs thereby eliminating the manual settings of the potentiometers 45–47.

It is to be further appreciated by one skilled in the art that while the micro-reactor has been described in reference to mixtures of naphthenes, aromatics, and paraffins, with appropriate modifications of the catalyst used, the micro-reactor can be adapted to analyze other fluid mixtures.

While the invention has been described with a certain degree of particularity, it can, nevertheless be seen by the examples hereinabove set forth that many modifications and variations of the invention may be made without departing from the spirit and scope thereof.

I claim:
1. A method for detecting a naphthene first component of a first fluid mixture consisting of said first component for detection and at least another fluid component said first component having physical properties sufficiently similar to at least said other fluid component rendering it difficult to separate or distinguish said first component, comprising the steps of:
   (a) Reacting said first fluid mixture by subjecting said first fluid mixture in the presence of a catalyst to a selective chemical reaction having a detectable effect on the heat of formation of at least a portion of said first fluid component said effect being in accordance with a predetermined relationship between the heat of said reaction and said first component for detection of said first fluid mixture;
   (b) sensing the temperature of said mixture prior and subsequent to said chemical reaction to determine the heat of said chemical reaction; and
   (c) generating a first signal representative of said first fluid component by generating said first signal in response to said sensed heat of reaction and in accordance with said predetermined relationship.

2. The method of claim 1 wherein said predetermined relationship is determined at least once in accordance with the steps comprising:
   (d) reacting a second fluid mixture having a predetermined concentration therein of said first naphthene fluid component, said reaction having a detectable effect on the heat of formation of said first fluid component of said second fluid mixture;
   (e) sensing the heat of said reaction of said second fluid mixture of step (d) and generating a second signal representative thereof;
   (f) reacting a third fluid mixture having a predetermined concentration therein of said naphthene first fluid component, said reaction having a detectable effect on the heat of formation of said first fluid component of said third fluid mixture;
   (g) sensing the heat of said reaction of said third fluid mixture of step (f) and generating a third signal representative thereof;
   (h) generating fourth and fifth signals representative respectively of said predetermined concentrations of said first fluid component in said second and third fluid mixtures; and
   (i) combining said second, third, fourth and fifth signals in a proportional relationship relating the sensed heat of said reactions of said second and third fluid mixtures with the concentration of said naphthene first fluid component in said second and third fluid mixtures, said proportional relationship being thereby representative of said predetermined relationship between the sensed heat of said reaction of said first fluid mixture and the concentration therein of said first fluid component.

3. The method of claim 2 wherein said sensing step (b) includes generating a sixth signal representative of said sensed heat of reaction of said naphthene first fluid mixture, wherein said heats of reaction of said first, second, and third fluid mixtures are sensed by respectively sensing the temperatures of said first, second, and third fluid mixtures prior and subsequent to said respective reactions, and wherein said second, third, fourth, fifth, and sixth signals are combined in said step (i) substantially in accordance with the following equation:

$$Y_{F1} = Y_{F3} + \frac{(Y_{F2} - Y_{F3})(T_I - T_{F1})}{(T_I - T_{F2}) - (T_I - T_{F3})}$$

where:

$Y_{F1}$ = The concentration of said first fluid component in said first fluid mixture, $Y_{F2}$ = the concentration of said first fluid component in said second fluid mixture, $Y_{F3}$ = the concentration of said first fluid component in said third fluid mixture, $(T_I - T_{F1})$ = the sensed heat of said reaction of said first fluid mixture, where $T_I$ and $T_{F1}$ correspond to the sensed temperatures thereof prior and subsequent to said reaction thereof respectively, $(T_I - T_{F2})$ = the sensed heat of said reaction of said second fluid mixture, where $T_I$ and $T_{F2}$ correspond to the sensed temperatures thereof prior and subsequent to said reaction thereof respectively, and:

$(T_I - T_{F3})$ = the sensed heat of said reaction of said third fluid mixture, where $T_I$ and $T_{F2}$ correspond to the sensed temperatures thereof prior and subsequent to said reaction thereof respectively.

4. The method of claim 2 comprising the further steps of heating said first, second, and third fluid mixtures to a temperature in the range of about 800° F. to 1000° F. at least in part prior to the respective reactions of said fluid mixtures of steps (a), (d), and (f).

5. The method of claim 4 comprising the further steps of subjecting said first, second, and third fluid mixtures to a pressure in the range of about zero to 600 p.s.i.g. at least in part during the respective reactions of said fluid mixtures of steps (a), (d), and (f).

6. The method of claim 2 wherein said reactions of steps (a), (d), and (f) are performed in the presence of a noble metal catalyst and in the presence of hydrogen, wherein said method includes the further steps of heating said first, second, and third fluid mixtures to a temperature in the range of about 850° F. to 950° F. at least in part prior to said reacting steps (a), (d), and (f), and wherein said method includes the further steps of subjecting said fluid mixtures to a pressure in the range of about 200 p.s.i.g. to 500 p.s.i.g. at least in part during said reacting steps.

7. The method of claim 6 wherein said first, second, and third fluid mixtures consist essentially of fluid components selected from the group consisting of aromatics, naphthenes and paraffins.

8. An apparatus for detecting a naphthene first component of a first fluid mixture from a source thereof, said first fluid mixture consisting of at least a first component for detection and at least another fluid component said first component having physical properties sufficiently similar to at least said other fluid component rendering it difficult to separate or distinguish said first component, comprising:

(a) means including a micro-reactor for reacting said fluid mixture in a selective chemical reaction having a detectably distinguishing effect on the heat of formation of at least a portion of at least one of said fluid components with respect to the balance of said first fluid mixture, said effect being in accordance with a predetermined relationship between the heat of said reaction and the concentration of said first fluid component for detection in said first fluid mixture; and (b) detection means including heat sensing means operatively coupled with said micro-reactor for detecting said first fluid component in accordance with said predetermined relationship by sensing the heat of said reaction.

9. An apparatus according to claim 8 wherein said means including a micro-reactor comprises:

(a,a) means including a chamber packed with a catalyst for subjecting said first fluid mixture to a selective chemical reaction having a detectable effect on the heat of formation of at least a portion of said first fluid component, said effect being in accordance with a predetermined relationship between the heat of said reaction and said first component for detection of said first fluid mixture, said chamber having an inlet end and an outlet end, said inlet end being coupled with said source of said first fluid mixture for flow thereof into said chamber, said first fluid mixture passing through said outlet end of said chamber after reacting therein; and (ab) a source of a carrier gas coupled with said inlet end of said chamber for carrying said first fluid mixture through said chamber.

10. An apparatus according to claim 9 wherein said means including a chamber (a,a) further includes heating means operatively coupled with said chamber (a,a) for heating said first fluid mixture to a temperature in the range of about 800° F. to 1000° F. at least in part prior to said reaction thereof in said chamber.

11. An apparatus according to claim 10 wherein said chamber is an insulated chamber for maintaining substantially adiabatic condition of said reaction therein and wherein said detection means including heat sensing means (b) comprises:

(ba) means including a first temperature sensor operatively coupled with said inlet end of said chamber for sensing the inlet temperature thereto of said first fluid mixture; and (bb) means including a second temperature sensor operatively coupled with said outlet end of said chamber for sensing the outlet temperature therefrom of said first fluid mixture;

The heat of said reaction in said chamber being manifested in a difference between said sensed inlet and outlet temperatures, and the concentration of said first fluid component in said first fluid mixture being determinable from said sensed temperatures in accordance with said predetermined relationship.

12. An apparatus according to claim 11 wherein said first and second temperature sensors comprise thermocouples.

13. An apparatus according to claim 11 further comprising:

(c) a source of a reference second fluid mixture having a predetermined concentration therein of said first fluid component;

(d) a source of a reference third fluid mixture having a predetermined concentration therein of said first fluid component:

(e) valve means coupled with said sources (c) and (d) and coupled with said chamber (a,a) for periodically introducing into said chamber said reference second fluid mixture and for periodically introducing into said chamber said reference third fluid mixture, when reacted in said chamber said reference fluid mixtures manifestive their respective heats of reaction sensed by said temperature sensors enabling calibration of the apparatus of claim 11 in accordance with a proportional relationship relating the sensed heat of the reactions of said reference fluid mixtures with the respective concentrations therein of said first fluid component, said proportional relationship being representative of said predetermined relationship between the sensed heat of reaction of said first fluid mixture and the concentration therein of said first fluid component for detection.

14. An apparatus according to claim 13 wherein said first component of said first, second, and third fluid mixtures consists essentially of naphthenes, wherein said catalyt of said chamber (a,a) includes a noble metal catalyst for subjecting said first second and third fluid mixtures to an endothermic dehydrogenation reaction of at least of portion of said first fluid component of said fluid mixtures when reacted in said chamber, wherein said source of a carrier gas (a,b) includes a source of hydrogen, and wherein said heating means coupled with said chamber (a,a) are adapted to heat said fluid mixtures to a temperature in the range of about 850° F. to 950° F. at least in part prior to the respective introduction of said first, second, and third fluid mixtures into said chamber for reaction therein.

15. An apparatus according to claim 14 wherein said chamber of said means (a,a) comprises a reaction chamber of about 4 feet of length of about ¼ inch diameter steel tubing packed with said noble metal catalyst, said catalyst having 35 to 80 mesh particle size, wherein said heating means coupled with said reaction chamber comprises; a preheater tube of about 2 feet of length of about 3/16 inches steel tubing connected to said inlet end of said reaction chamber and coupled through said valve means with said sources of said first, second, and third fluid mixtures for flow thereof through said preheater tube prior to introduction thereof into said reaction chamber, a lead filled heating chamber in which is mounted said preheater tube for uniform heating thereof, and electrical heating coils mounted in said heating chamber for heating said preheater tube and said first, second, and third fluid mixtures to a temperature of about 850° F. to 950° F. prior to the respective reactions thereof in said reaction chamber, said apparatus of claim 14 further comprising:

(f) pressure regulation means for regulating the pressure in said reaction chamber in the range of about 200 p.s.i.g. to 500 p.s.i.g during the respective reactions therein of said first, second, and third fluid mixtures; and (g) computing means coupled with said first and second temperature sensors for computing the concentration in said first fluid mixture of said first component for detection in accordance with said proportional relationship.

16. An apparatus according to claim 15 wherein said computing means (g) comprises:

(ga) manual entry and signal generating means for entering into said computer the values of said predetermined concentrations in said reference second and third fluid mixtures of said first fluid component and for generating concentration second and third signals representative respectively thereof;

(gb) first signal generating means for generating fourth and fifth signals representative respectively of said sensed heats of reaction of said second and third fluid mixtures;

(gc) first difference measuring means coupled with said first and second temperature sensors for generating a difference sixth signal representative of the difference between said sensed reaction chamber inlet and outlet temperatures of said first fluid mixture reacted therein;

(gd) second difference measuring means coupled with said manual entry means (ga) for generating a difference seventh signal representative of the difference between said concentration second and third signals;

(ge) third difference measuring means coupled with said first signal generating means (gb) for generating a difference eighth signal representative of the difference between said sensed heat fourth and fifth signals;

(gf) first division means coupled with said second and third difference measuring means (gd) and (ge) for generating a quotient ninth signal representative of the quotient of said difference seventh signal divided by said difference eighth signal;

(gg) first multiplication means coupled with said first difference measuring means (gc) and with said first division means (gf) for generating a product tenth signal representative of the product of said difference sixth signal and said quotient ninth signal; and (gh) addition means including output means coupled with said manual entry means (ga) and with said first multiplication means (gg) for generating an output first signal representative of the sum of said concentration third signal and said product tenth signal, said output first signal corresponding to the concentration in said first fluid mixture of said first component for detection in accordance with said proportional relationship.

References Cited

UNITED STATES PATENTS

| 1,908,202 | 5/1933 | White | 73—190X |
| 3,172,730 | 3/1965 | Glassbrook et al. | 23—230 |
| 3,226,197 | 12/1965 | Lewis | 23—230 |
| 3,304,159 | 2/1967 | Hinsvark | 23—230 |
| 3,410,663 | 11/1968 | Reilly et al. | 23—230 |
| 3,425,807 | 2/1969 | Levy | 23—230X |
| 3,440,013 | 4/1r69 | Carr et al. | 73—190X |
| 3,455,655 | 7/1969 | Plantz et al. | 23—232 |
| 3,466,228 | 9/1969 | Trebes | 23—230X |
| 3,467,501 | 9/1969 | Groszek | 23—230 |

OTHER REFERENCES

Cousins et al., Dehydrogenation as an Aid to the Mass Spectrometric Analysis of Naphthenes, Analytical Chemistry, vol. 33, No. 13, December 1961, pp. 1875–1878.

MORRIS O. WOLK, Primary Examiner

R. E. SERWIN, Assistant Examiner

U.S. Cl. X.R.

23—232, 253, 254; 73—190; 235—151.12, 151.35